United States Patent
Chelloug

(10) Patent No.: US 7,948,722 B2
(45) Date of Patent: May 24, 2011

(54) DIFFERENTIAL PROTECTION DEVICE

(75) Inventor: Mustapha Chelloug, Echirolles (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 486 days.

(21) Appl. No.: 11/987,063

(22) Filed: Nov. 27, 2007

(65) Prior Publication Data

US 2008/0144239 A1 Jun. 19, 2008

(30) Foreign Application Priority Data

Dec. 18, 2006 (FR) ...................................... 06 11010

(51) Int. Cl.
*H02H 3/00* (2006.01)
*H02H 9/08* (2006.01)

(52) U.S. Cl. ................ 361/42; 361/43; 361/44; 361/45; 361/46; 361/47; 361/48; 361/49; 361/50

(58) Field of Classification Search ...................... 361/42
See application file for complete search history.

(56) References Cited

U.S. PATENT DOCUMENTS

| 4,833,564 | A * | 5/1989 | Pardue et al. | ................. 361/93.6 |
| 6,421,214 | B1 * | 7/2002 | Packard et al. | ................... 361/7 |
| 6,831,819 | B2 * | 12/2004 | Nemir et al. | ................... 361/42 |

FOREIGN PATENT DOCUMENTS

EP 0 936 716 8/1999

* cited by examiner

*Primary Examiner* — Dharti H Patel
(74) *Attorney, Agent, or Firm* — Steptoe & Johnson LLP

(57) ABSTRACT

A differential protection device comprising:
  differential current measuring means,
  processing means connected to the measuring means and comprising operating rating selection means and time delay selection means to select tripping curves,
  actuating means, and
  test means connected to the measuring means.
In the protection device the test means are associated with the operating rating selection means and with the time delay selection means to select a minimum or reduced operating rating and to select a minimum or reduced time delay when said test means are actuated.

5 Claims, 3 Drawing Sheets

DIFFERENTIAL PROTECTION DEVICE

BACKGROUND OF THE INVENTION

The invention relates to a differential protection device comprising:
  differential current measuring means,
  processing means connected to the measuring means to receive a signal representative of a differential current, said processing means comprising operating rating selection means and time delay selection means to select tripping curves,
  actuating means to open main contacts of the circuit breaker according to the tripping curve selection, and
  test means connected to the measuring means.

STATE OF THE ART

The patent application EP 0 936 716 describes a differential protection device comprising differential current measuring means, processing means connected to the measuring means to receive a signal representative of a differential current, selection means to select an operating rating of the processing means, test means connected to the measuring means and associated with the rating selection means to select a low rating when said test means are actuated, and actuating means.

The test means of differential protection devices of the prior art are implemented by generating a test current presenting a sufficient intensity to be detected by the differential current measuring means. A drawback of the test means implemented in differential protection devices of the prior art is a non-optimized power consumption.

SUMMARY OF THE INVENTION

The object of the invention is to remedy the drawbacks of devices of the prior art by proposing a differential protection device comprising:
  differential current measuring means,
  processing means connected to the measuring means to receive a signal representative of a differential current, said processing means comprising operating rating selection means and time delay selection means to select tripping curves, and
  actuating means to open main contacts of the circuit breaker according to the tripping curve selection, and
  test means connected to the measuring means.

In the differential protection device according to the invention, the test means are associated with the operating rating selection means and with the time delay selection means to select a minimum or reduced operating rating and to select a minimum or reduced time delay when said test means are actuated.

Preferably, the test means are associated with an input circuit of the processing means to increase the gain of amplifying means, when the test means are actuated.

Preferably, the test means comprise a control switch, said switch enabling a test current to be generated for a period that is longer than the minimum time delay. Advantageously, the test current is generated with an initial time delay of more than 50 milliseconds. Advantageously, the test current comprises at least one pulse, and preferably at least one pulse train. In this case, the at least one pulse train preferably has a duration that is longer than the minimum time delay, for example less than ten times the minimum time delay. Preferably, the test current comprises a plurality of pulse trains separated by a period of at least twice the minimum or reduced time delay.

BRIEF DESCRIPTION OF THE DRAWINGS

Other advantages and features will become more clearly apparent from the following description of particular embodiments of the invention given as non-restrictive examples only and represented in the accompanying drawings.

DETAILED DESCRIPTION OF AN EMBODIMENT

Figure 1:
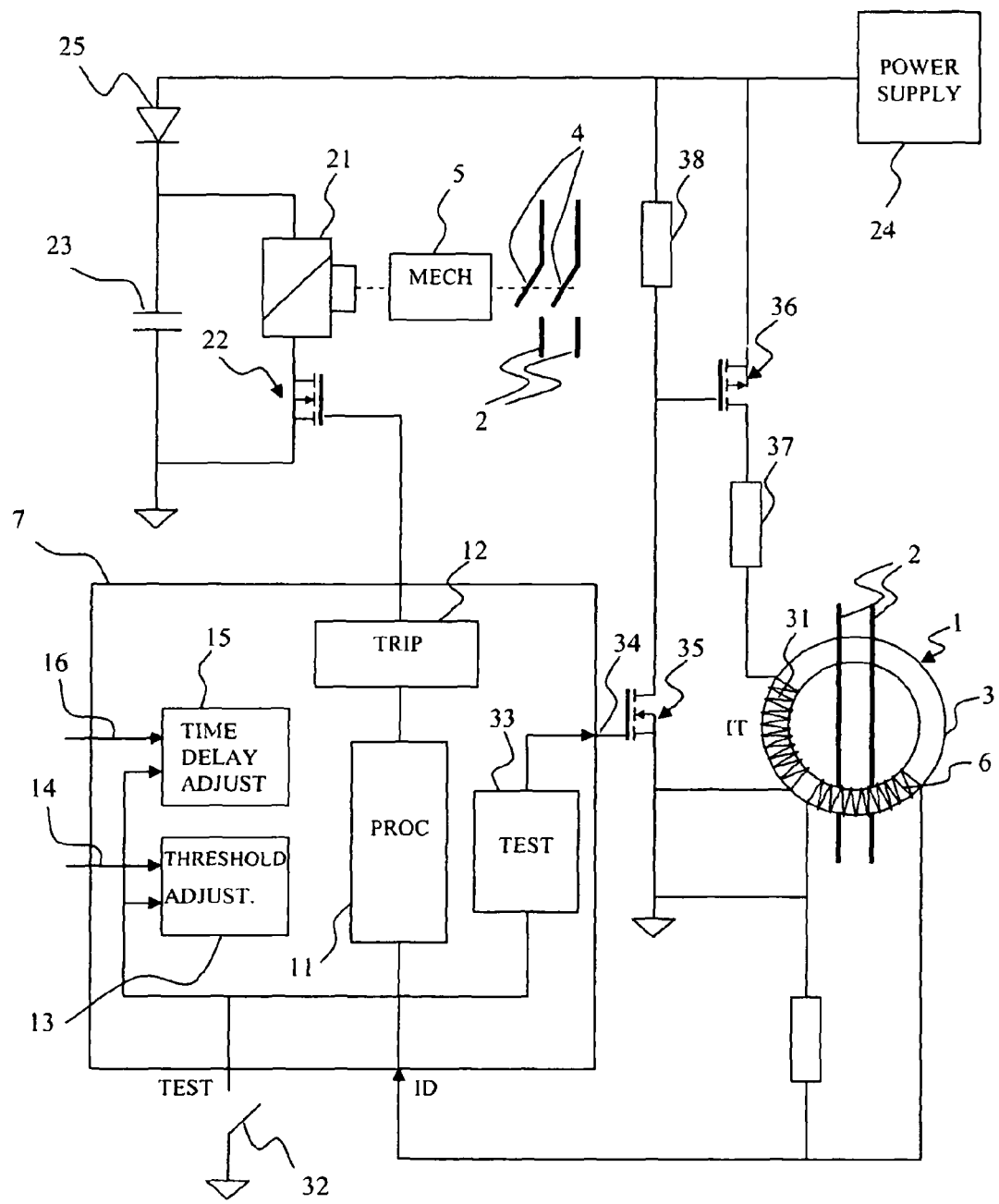
FIG. 1 schematically represents a differential protection device and the associated test means according to an embodiment of the invention.

The circuit breaker represented in FIG. 1 is a differential protection device comprising a measuring toroid 1 for measuring a differential current in line conductors 2 of an installation to be protected. A magnetic circuit 3 of the toroid surrounds the line conductors which thus form a primary winding. The line conductors are connected in series with main contacts 4 which can be opened by a mechanism 5. These contacts can be the contacts of a relay, a switch or a circuit breaker.

In the differential protection device of FIG. 1, the measuring toroid 1 comprises a first secondary winding 6 connected to a processing circuit 7 to receive a signal ID representative of a differential current. A load resistor 8 is connected to the ends of the first secondary winding to determine the maximum sensitivity of the processing circuit.

The processing circuit 7 also comprises a current processing circuit 11 to supply a trip command to a trip circuit 12 enabling the mechanism to be actuated 5 to open the main contacts 4. The current processing circuit 11 is connected to the first secondary winding 6 of the toroid 1 to receive the signal ID representative of a differential current flowing in the conductors 2. A first adjustment device 13 connected to the current processing circuit 11 enables the operating rating or a predetermined operating threshold to be adjusted or selected. Adjustment or selection is performed via an input 14. If the differential current in the conductors 2 exceeds this operating threshold, the protection device acts for example on the main contacts 4. A second adjustment device 15 also connected to the current processing circuit 11 enables the time delay to be adjusted or selected. Adjustment or selection is performed via an input 16. The trip command is thus applied to the trip circuit 12 with the selected time delay. Selection of the operating rating and selection of the time delay enable the tripping curve to be selected.

The trip circuit 12 is connected to an actuator 21 by means of a control transistor 22. The actuator enables the main contacts 4 of the circuit breaker to be opened in response to an electric fault of the differential type and according to the tripping curve selection. The actuator 21 and the control transistor 22 are connected in parallel with an electric power storage capacitor 23 enabling the electric power supply of the actuator to be maintained. This capacitor is supplied by a power supply 24 via a diode 25.

The differential protection device of the invention further comprises test means enabling a test current IT to be sent to a second secondary winding 31. The test means comprise a switch in the form of a push-button 32 connected to a test circuit 33 in the processing circuit 7. The test circuit generates a test signal on an output 34 of the processing circuit 7 in response to closing of the push-button 32. This output 34 is itself connected to the second secondary winding 31 of the measuring toroid by means of amplifying means electrically supplied by the power supply 24. These amplifying means comprise two transistors 35 and 36 and two resistors 37 and 38. In the case of FIG. 1, the transistors 35 and 36 have a switch function. The pulses delivered by the output 34 enable closing of these switches to be commanded to generate a test current IT in the second secondary winding 31. The resistor 37 serves the purpose of limiting the current in the second secondary winding 31 and the resistor 38 serves the purpose of biasing the switch 36. In this way when a test is performed, an action on the switch 32 enables a test current IT to flow in the second secondary winding 31.

As represented in FIG. 1, the switch 32 of the test means is also connected to the operating rating selection means 13 and to the time selection delay means 15. This association of the test means with the operating rating selection means 13 and with the time delay selection means 15 enables a minimum or reduced operating rating and a minimum or reduced time delay to be selected, when said test means are actuated. The test means of the device thereby act on the adjustment devices 13 and 15 to select both a minimum or reduced rating and a minimum or reduced time delay. In this way, when a test is performed, a test current IT of weak intensity is sufficient to test operation of the differential protection device, and the electrical consumption is therefore optimized. To limit the value of the test current even further, the number of turns of the second secondary winding 31 can be increased. The ratio between the number of turns of the second secondary winding and of the first secondary winding is limited by the space around the toroid. This ratio can be comprised between 1 and 50, for example equal to 10.

Figure 2:
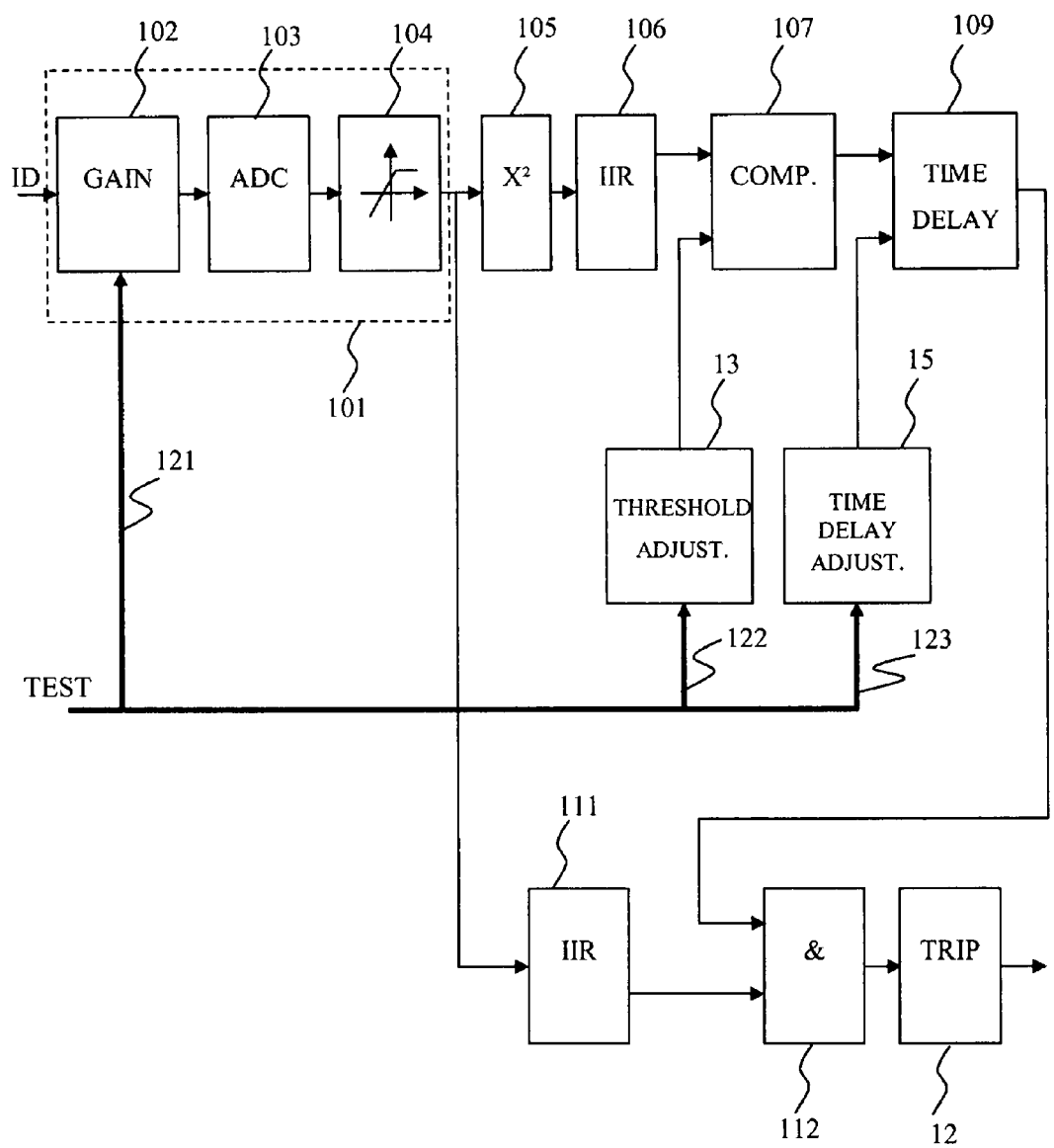
FIG. 2 is a functional diagram of the control circuit of the differential protection device according to an embodiment of the invention.

As represented in FIG. 2, the current processing circuit 11 comprises a succession of modules enabling a trip command to be supplied to the trip circuit 12 according to the signal ID representative of a differential current. In the embodiment represented in FIG. 2, the current processing circuit comprises an input circuit 101 for receiving and processing the signal ID representative of the differential current. The input circuit is equipped with an amplifier 102, an analog-to-digital converter 103 and a high-pass filter 104 to select the DC part of the signal. A multiplier module 105, in this instance for raising to the square, and a low-pass filter 106 enable the rms value of the differential current to be determined. A comparator module 107 compares the rms value of the differential current with an operating rating selected by means of the rating selection means 13. When the rms value of the differential current is greater than the operating rating, a first activation signal is sent to a time delay module 109. The time delay module transmits the first activation signal after a time delay selected by time delay selection means 15 has elapsed. In parallel with the modules 105, 106, 107 and 109, the signal from the high-pass filter 104 is transmitted, after filtering in a high-speed filter 111, as second activation signal. The filter 111 enables a rapid validation of the presence of a differential fault to be performed. The processing by the modules 105, 106, 107 and 109 is less fast than that performed by the filter 111. The two activation signals are sent to a boolean module 112 which performs a logic 'AND'. When the activation signals are sent at the same time, a trip command is sent to the trip circuit 12. Thus, for a trip command to be sent, the presence of a differential fault has to be validated by the high-speed filter 111 at least until the end of the time delay period.

As represented in FIG. 2, the test switch is functionally connected to the amplifier 102 of the input circuit 101 by a functional link 121. Actuation of the test switch enables the gain of the amplifier 102 to be increased to a high or maximum value. The test switch is also functionally connected to the operating rating selection means 13 by a functional link 122. Actuation of the test switch thus enables a minimum or reduced operating rating to be selected. In the same way, the test switch is functionally connected to the time delay selection means 15 by a functional link 123. Actuation of the test switch thus enables a minimum or reduced time delay minimum to be selected. These functional relations between the test means on the one hand and the operating rating selection means, the time delay selection means and the input circuit amplifying means on the other hand combine to achieve optimization of the electric power consumption of the differential protection device.

Figure 3A:
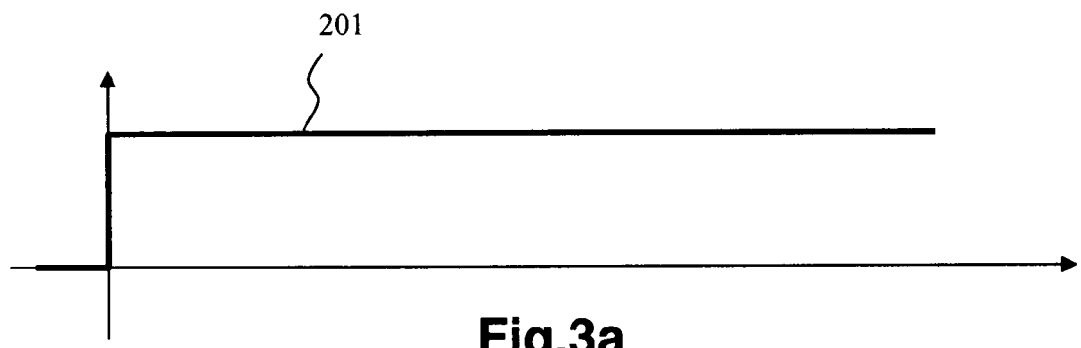
FIGS. 3a and 3b represent, for example purposes, the test command signal and the test signal of the differential protection device.
Figure 3B:
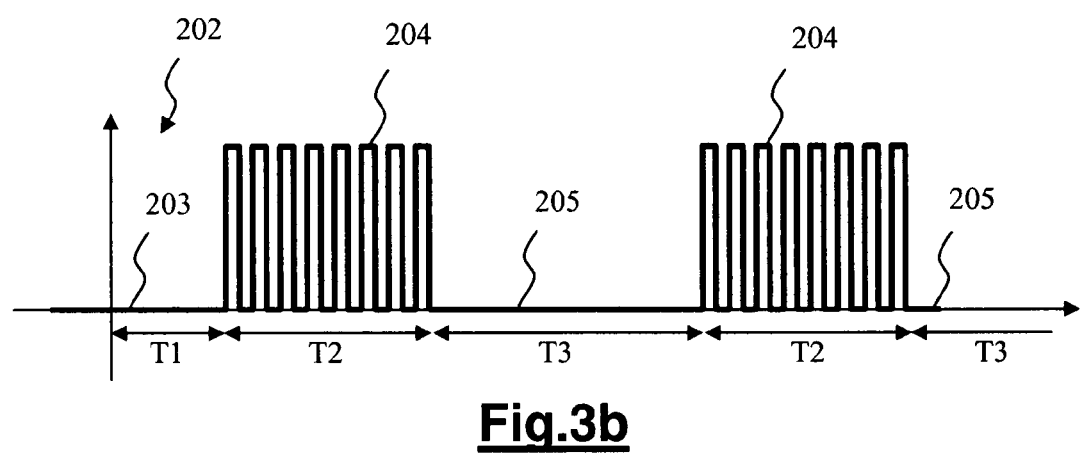

An example of operation of the test means of the protection device of the invention is illustrated in FIGS. 3a and 3b. A test command signal 201 is generated by actuating the push-button 32. As represented in FIG. 3a, the command signal goes from a low state to a high state when the test push-button is actuated. The test circuit 33 represented in FIG. 1 generates a test signal 202 in response to the test command. This test signal, after amplification, enables the test current IT to be sent to the second secondary winding 31. As represented in FIG. 3b, the test signal 202 comprises an initial phase 203 with a duration T1 during which this signal is held at a low state corresponding to the absence of test current. This time T1 is advantageously more than 50 milliseconds, for example equal to 150 milliseconds. The initial time delay corresponding to this initial phase enables sending of a test current to be prevented when the test push-button is actuated by error or inadvertently. The test signal comprises pulse trains 204 generating current pulses. These pulses are generated by an oscillator comprised in the test circuit 33. The duration T2 of these pulse trains is greater than the minimum or reduced time delay. For example, the duration T2 of the pulse train can be equal to twice the minimum or reduced time delay. Limiting the time T2 enables the power consumption of the device to be optimized. As represented in FIG. 3b, the test signal 202 comprises a plurality of pulse trains 204 separated by phases of inactivity with a time T3 enabling the electric power storage capacitor 23 to be recharged. The time T3 can be greater than twice the minimum or reduced time delay, for example equal to 500 milliseconds. Limiting the duration T2 of the pulse trains and increasing the time T3 combine to achieve optimization of the power consumption of the differential protection device according to the invention.

The differential protection device according to the invention can be fitted to any protection device in so far as differential current measurement is performed.

The invention claimed is:
1. A differential protection device comprising:
   differential current measuring means,
   a power supply,
   processing means connected to the differential current measuring means to receive a signal representative of a differential current, said processing means comprising operating rating selection means and time delay selection means for selecting tripping curves, actuating means for opening main contacts of the differential protection device according to the tripping curve selection, and test means connected to the differential current measuring means, wherein the test means are coupled with the operating rating selection means and with the time delay selection means for selecting a minimum or reduced operating rating and for selecting a minimum or reduced time delay when said test means are actuated, and the test means comprise a control switch for enabling a test current to be generated by the power supply during a period that is longer than the minimum time delay, the test current comprising at least one pulse train having a duration that is longer than the minimum time delay.

2. The device according to claim 1, wherein the test means are coupled with an input circuit of the processing means to increase the gain of amplifying means when the test means are actuated.

3. The device according to claim 1, wherein the test current is generated with an initial time delay of more than 50 milliseconds.

4. The device according to claim 1, wherein the at least one pulse train has a duration that is less than ten times the minimum time delay.

5. The device according to claim 1, wherein the test current comprises a plurality of pulse trains separated by a time that is at least twice the minimum or reduced time delay.

* * * * *